(No Model.)
L. SOSEMAN & T. SOSEMAN, Jr.
APPARATUS FOR STACKING HAY, STRAW, &c.
No. 249,413. Patented Nov. 8, 1881.
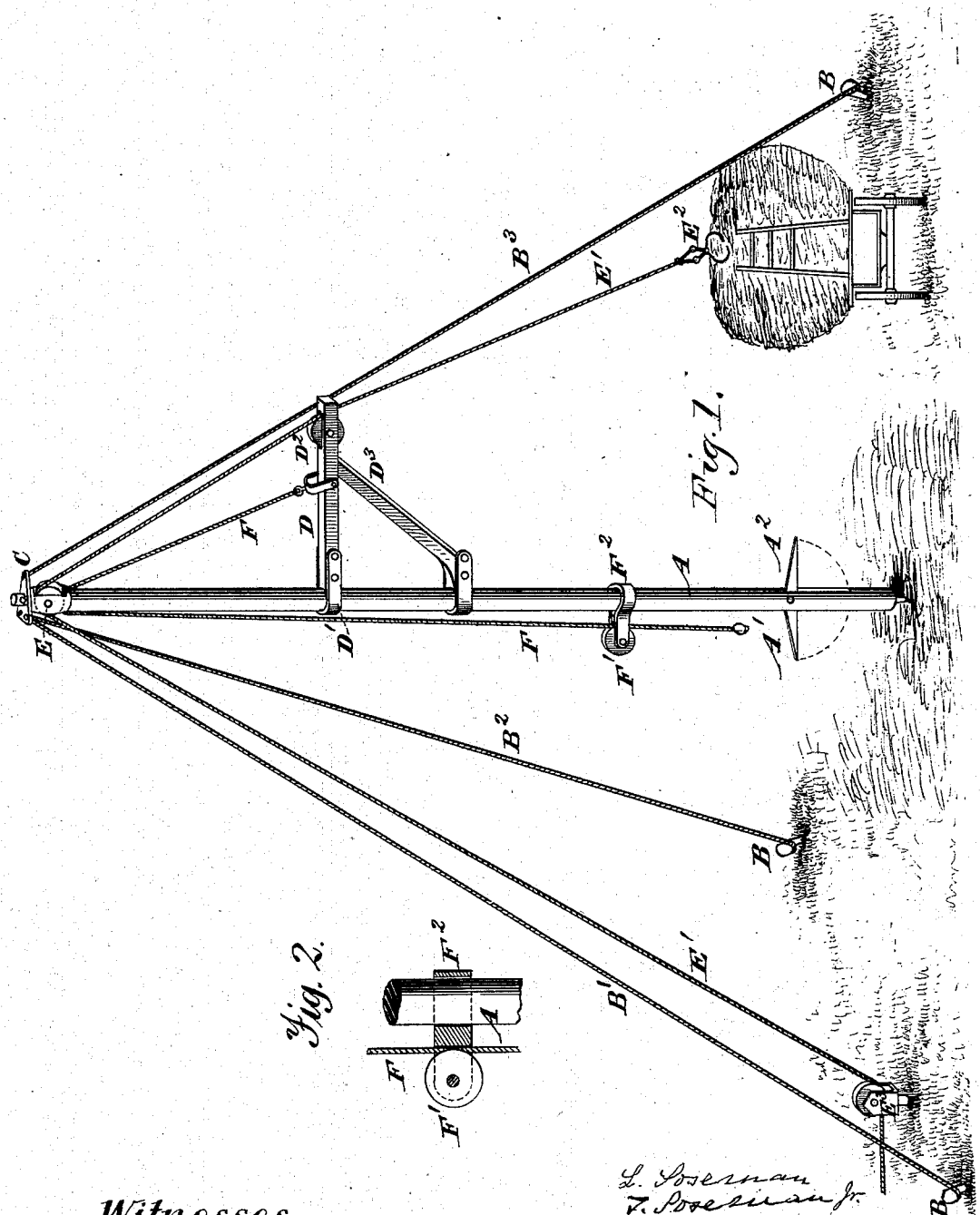
Witnesses.
A. Ruppert.
C. M. Connell.
L. Soseman
T. Soseman Jr.
Inventor.
Holloway & Blanchard
Atty

UNITED STATES PATENT OFFICE.

LABAN SOSEMAN AND THOMAS SOSEMAN, JR., OF SOUTH BEND, INDIANA.

APPARATUS FOR STACKING HAY, STRAW, &c.

SPECIFICATION forming part of Letters Patent No. 249,413, dated November 8, 1881.

Application filed April 7, 1881. (No model.)

*To all whom it may concern:*

Be it known that we, LABAN SOSEMAN and THOMAS SOSEMAN, Jr., citizens of the United States, residing at South Bend, in the county of St. Joseph and State of Indiana, have invented certain new and useful Improvements in Apparatus for Stacking Hay, Straw, and other Substances; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in apparatus for stacking hay and straw in the field; and the object of our improvement is to provide an apparatus containing certain combinations and arrangements of parts by which hay and straw and other similar substances can be stacked in a field or in any desired location, and the stack raised to any desired height by raising the center-pole after the material has reached a certain height, and without removing it from the stack. We attain this object by the mechanism illustrated in the accompanying drawings, in which—

Figure 1 is an elevation showing the central pole of the stacker, having near its lower end pivoted arms for aiding in holding it in position, a vertically-moving arm for placing the material upon the stack, guy-ropes for holding the pole in position, and a lifting-rope with a clamp at one of its ends for elevating the material to be stacked; and Fig. 2 is a side elevation, showing a portion of the central pole, lifting-rope, the sliding guide through which it passes, and an eccentrically-formed pulley or sheave in its outer end.

Similar letters refer to similar parts in both of the figures.

In constructing stackers of this character we provide a pole, A, of suitable length and diameter, which may be made of wood, or it may be a metal tube, its lower end being, by preference, provided with a small pointed pin for entering the earth or the platform upon which the stack is to be formed. At a suitable distance from the lower end of the pole A there are pivoted two or more arms, A' A², they being so arranged that when extended, as shown in the drawings, they will rest upon the material being stacked, but so that when said material has been raised to the proper height the pole may be lifted up, in doing which the arms will fall down, as indicated by dotted lines, and thus allow of the raising of the pole without otherwise displacing it, and when thus raised and allowed to settle down a little the arms will be opened out to their first-named position, and by bearing upon the material will prevent said pole from sinking too low, by which means the stack can be carried to any desired height by simply lengthening the guy-ropes which are attached to the upper end of the pole.

The lower ends of the guy-ropes above alluded to are secured to anchor B, driven into the earth at suitable points, as shown, there being three or more of such ropes, which are designated by the letters B', B², and B³, having their upper ends secured to a plate or arm, C, attached to the upper end of the pole A.

In first setting the pole it is placed in the desired position on the earth, or on a platform of any suitable construction, the point upon its lower end being made to penetrate the substance upon which it stands. The anchors B are then placed in their proper positions and the guy-ropes fastened to them in such manner that when the material has been raised to such a height as to require it they may be detached from said anchors and the pole raised to the required height to enable the operator to complete the stack, when they are again secured to the anchors.

For the purpose of carrying the material to its position on the stack after it has been raised there is provided an arm, D, the inner end of which is furnished with a band of metal, D', which surrounds the pole and admits of its being raised and lowered thereon.

The length of the arm D may be varied, according to the diameter it is desirable to make the stack, and its outer portion may have the slot in which the sheave D² works lengthened to any desired extent, so that said sheave may be carried to the requisite distance from the pole A, and thus permit the material being raised to be carried to its proper elevation without coming in contact with the stack.

For the purpose of supporting the arm D there is attached to its under side a brace, D³, the lower end of which is provided with a loop or band similar in all respects to that placed upon the arm, it embracing the pole and moving thereon with said arm.

In the upper portion of the pole A there is placed a sheave, E, over which passes a rope, E', one end of which is provided with any desirable fork or clamp, E², for taking hold of the hay or straw which may be brought to it upon a wagon or in any other manner and raising it to its proper position, the rope for this purpose passing over the sheave D² in the arm D, over the sheave E in the upper end of pole A, and then down to and under a sheave, E³, anchored to the earth or to a platform, from which point it extends outward far enough to admit of there being attached to it any desired animal or device for furnishing the power to raise the material.

For the purpose of raising and supporting the arm D there is attached to it a rope, F, which extends upward therefrom to and through a slot in the upper end of pole A, and thence downward to an eccentric pulley, F', carried in slide F², which surrounds the pole A and moves up and down thereon. When it is desirable to raise the arm the lower end of rope F is pulled upon and the arm is raised to its desired position, when said rope is allowed to move back a little through pulley F', which, if properly adjusted, will wedge it against slide F², and thus support the arm at any desired height until another change is desired, when the rope is again pulled upon to raise it higher, or is paid out to lower it, as circumstances may require.

Having thus described our invention, what we claim, and desire to secure by Letters Patent, is—

1. An apparatus for stacking hay, straw, and other substances, combining in its construction a central pole, A, guy-ropes B' B² B³, for holding the pole in position, anchors B, or their equivalents, for holding the guy-ropes, a rope, E', and grapple E², for raising the material, an arm, D, having both a vertical and rotary movement upon the pole and carrying in its outer end a pulley, D², a rope, F, for raising the arm D, and a vertically-moving eccentric pulley, F', the parts being arranged for joint operation, substantially as set forth.

2. In an apparatus for stacking hay, straw, and other substances, the combination of a vertically-adjustable pole and pivoted arms, arranged as described, whereby they are made capable of closing down upon the pole while it is being raised up through the hay or straw, and then opening out, so as to prevent the pole from sinking down into the material, substantially as described.

3. In an apparatus for stacking hay, straw, and other substances, the combination of a central vertically-adjustable pole and a sliding device for guiding a rope, which device carries in it an eccentrically-formed sheave or pulley, whereby the rope is both guided and held in its adjusted position, and is thus made to hold adjustable arms, to which it is attached in its proper place, substantially as described.

In testimony whereof we affix our signatures in presence of two witnesses.

LABAN SOSEMAN.
THOMAS SOSEMAN, Jr.

Witnesses:
WILLIS A. BUGBEE,
A. B. FRANK.